(12) United States Patent
Anton et al.

(10) Patent No.: US 6,456,038 B1
(45) Date of Patent: Sep. 24, 2002

(54) ELECTRICAL STORAGE CELL BATTERIES

(75) Inventors: Antonio Ripoll Anton, Madrid; Rafael Ruiz Rodriguez, Guadalajara, both of (ES)

(73) Assignee: Sociedad Española del Acumulador Tudor, S.A. (ES)

( * ) Notice: Subject to any disclaimer, the term of this patent is extended or adjusted under 35 U.S.C. 154(b) by 0 days.

(21) Appl. No.: 09/879,271

(22) Filed: Jun. 12, 2001

(30) Foreign Application Priority Data

Jun. 13, 2000 (ES) .............................................. 20001486

(51) Int. Cl.$^7$ .................................................. H02J 7/00
(52) U.S. Cl. ........................................ 320/107; 320/112
(58) Field of Search ................................ 320/107, 112; 429/99, 123, 158, 159, 96, 175

(56) References Cited

U.S. PATENT DOCUMENTS 5,283,137 A  *  2/1994 Ching ........................ 429/175

6,023,146 A  *  2/2000 Casale et al. ................ 320/112

* cited by examiner

Primary Examiner—Edward H. Tso
Assistant Examiner—Lawrence Luk
(74) Attorney, Agent, or Firm—Ostrolenk, Faber, Gerb & Soffen, LLP

(57) ABSTRACT

Electrical storage cell battery comprising electrically interconnected cells each comprising positive plates, negative plates, intermediate separators and free or immobilized electrolyte, each cell further comprising an independent cylinder which ends on its open top in a common prismatic vessel, with all cylinders placed parallel to and near each other. In the same plane, the vessel is provided at least on its external lateral surface with complementary connecting elements for mechanical attachment to other vessels, including female connecting elements and male connecting elements provided on at least two of the opposite faces of the vessel. The connecting elements may also be placed on the cylinders.

13 Claims, 10 Drawing Sheets

ELECTRICAL STORAGE CELL BATTERIES

The present invention relates to an electrical storage cell battery, of the type comprised of electrically interconnected cells, each cell housing positive and negative plates, intermediate separators and electrolyte of the free or immobilized type.

The battery of the invention is preferably a lead-acid battery, of the type used, among other applications, for start-up, illumination and semi-traction of automobiles.

More specifically, the battery of the invention relates generically to a conventional type storage cell, also known as flooded, or to a gas recombination type cell with gas outlet controlled by a valve, also known as an immobilized electrolyte storage cell, as the electrolyte is embedded in a glass fiber separator or is in the form of a gel.

BACKGROUND OF THE INVENTION

The trend in automobile manufacturing is evolving towards increasingly complex equipment which require greater power. Thus, batteries must be more powerful and resistant to charge and discharge cycles, in order to ensure start-up.

It is standard practice to manufacture batteries rated at twelve volts. In order to fulfil higher power requirements, an increase in the voltage to 36 volts is being considered. However, although a simple series connection of three 12 volt batteries would provide the 36 volts, the space occupied by three such batteries would be three times greater than that for a single one. In addition, electrical connections must be sufficiently reliable and of a length and section such that resistance caused voltage loss is minimal. Furthermore, both the mechanical and electrical connections should be sturdy enough to withstand the vibrations suffered by the vehicle, particularly when traveling on uneven ground.

Additionally, current 12 volt batteries have their various cells back to back to each other, resulting in significant cooling differences in the cells. Thus, as the battery is warmed by the heat lost by the engine, certain cells undergo a much higher temperature rise than others which are better refrigerated. Cells that are at a higher temperature will suffer a greater evaporation rate of the water in which the electrolyte acid is dissolved, so that the electrolyte concentration will become higher. Furthermore, the higher is the temperature, the greater is the load current, and the greater the over current, causing a decomposition of the electrolyte water, further contributing to the increase in electrolyte concentration. The greater is the electrolyte concentration the greater will be the battery deterioration, not only due to the chemical attack on the active materials and the grids but as the electrolyte water content decreases, the level on the plates falls and eventually the plates may not be covered, resulting in permanent damage to plates, welding and separators. This damages both battery operation and lifetime.

These refrigeration problems are considerably increased when three current type 12 volt batteries are joined to obtain 36 volts.

DESCRIPTION OF THE INVENTION

The object of the present invention is to solve the aforementioned problems with a battery of the type described above, constructed to allow optimum refrigeration of the various cells and that is provided with means for connection to other batteries, in order to obtain sets which multiply the rated voltage, without reducing the refrigeration capacity of the cells.

The battery of the invention has the advantage, as compared with traditional batteries, of having a refrigeration area for each cell which ensures that the cell temperature is never too high nor different from the temperature of the other cells. Additionally, the solution proposed by the invention for mechanical attachment between two or more batteries as well as for their electrical connection allows to obtain sets which may withstand vehicle vibrations without being harmed, even when the vehicle is traveling on uneven ground. All of this causes increased performance and lifetime of the battery of the invention.

A further object of the invention is to provide a battery with an external configuration allowing connection of two or more batteries in several positions, so that a set is obtained with a geometry and arrangement which can be adapted to the space available for installation in each case.

The battery of the invention comprises electrically interconnected cells, each of which is provided with elements which comprise positive plates, negative plates, intermediate separators and free or immobilized electrolyte.

The positive and negative plates which make up the electrodes are of the pasted type, and plates of like polarity are separated from the opposite plates by a separator, which may be porous or preferably of glass micro fiber. These positive and negative plates are preferably wound in a spiral.

Electrical connections between the various elements of different cells consist of automatic fusion welding in a mold or COS welding. The electrical connection is preferably shaped as an Omega.

Each cell is further contained in an independent cylinder, with all the vessels of a battery placed in parallel, in a same plane, either next to or tangent to each other, so that there are longitudinal spaces between the cylinders which ensure uniform refrigeration, thereby avoiding temperature differences between the cells.

Each of these cylinders is connected to the others forming a battery with an open top on the bottom of a preferably rectangular prismatic vessel. The vessel is externally provided on its sides with complementary means of attachment to other vessels. These mechanical attachment means are preferably male and female elements which couple to each other and are provided on at least two opposing sides of the vessel.

The mechanical connection means allow joining of two or more batteries with their vessels touching or near each other, but with longitudinal cooing spaces left between the cell cylinders.

In order to improve the connection between batteries, the invention includes complementary means on the cell cylinders on diametrically opposing positions, so that the batteries are joined by the vessel connection means and the cylindrical cell means.

Preferably, the male and female elements of the battery mechanical connection means have a dovetail configuration, so that they may be joined by relative displacement of the batteries to be connected.

There is a vessel at the upper end of the cell cylinders of a given battery. The vessel has internal transverse partitions generally at the spaces between the cells. the partitions all have an upper central groove for passage of the electrical connection bridges between adjacent cells.

The open top part of the prismatic vessel is closed with a prismatic lid provided with filling orifices placed opposite each cell, in order to allow formation or first charge. The ends of the lid contain embedded cold-stamped bushings which are later welded to the terminals of the end cells to form the corresponding positive and negative terminals.

The lid is also provided with an orifice meant to house a valve. The valve is a cylindrical cap made of a special elastomer, which ensures outlet of gases to the exterior but which prevents their entry.

The end sides of the lid have air passage ducts which allow an effective cell refrigeration when several cells are joined.

A prismatic cover is on top of the lid in order to seal it from the outside. The cover is provided on its inside with a first circular flange which communicates with a centralized gas outlet tube provided in the center of one of the cover sides. A second circular flange is also provided which matches the housing of the elastomer valve to ensure that the valve remains in its position and that gas outlet can only take place through its sides. The cover is preferably provided with a number of flanges matching the filling orifices of the lid in order to close them.

A microporous plastic element, such as a vyon pill, known in this field because it channel all gases which may be emitted by the battery towards the outlet tube, is placed inside the first cover flange. This microporous element allows gas outlet by diffusion through its pores, acting as a flame trap system so that if any sparks ignite the hydrogen emitted by the battery when it is charging, that element would prevent the flames from entering the cells.

The electrical series connection of the batteries is performed with a connector, which preferably consists of a metal bridge ending in two clamps adaptable to the size of the corresponding terminal. The clamps are tightened with butterfly nuts which press on the terminal when tightened, providing a reliable and highly vibration-resistant connection.

A more detailed description of the invention appears below with reference to the accompanying drawings relating to embodiments of the invention shown for purposes of illustration only and not meant as a definition of its limits.

DESCRIPTION OF A PREFERRED EMBODIMENT

Figure 1:
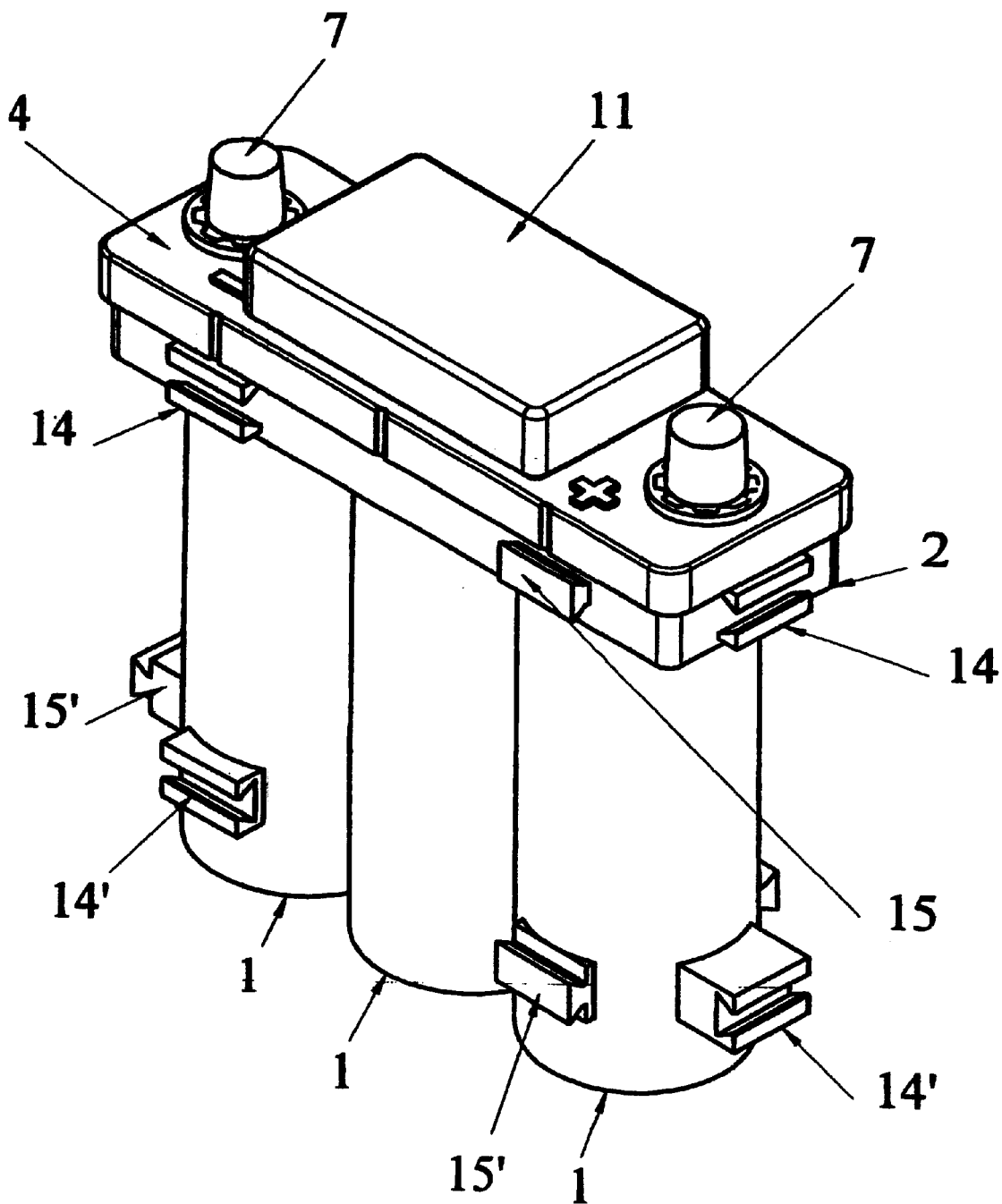
FIG. 1 is a perspective view of a battery according to an embodiment of the invention, with three cells in which the vessel and the cylinders are provided with complementary mechanical means of attachment.
Figure 2:
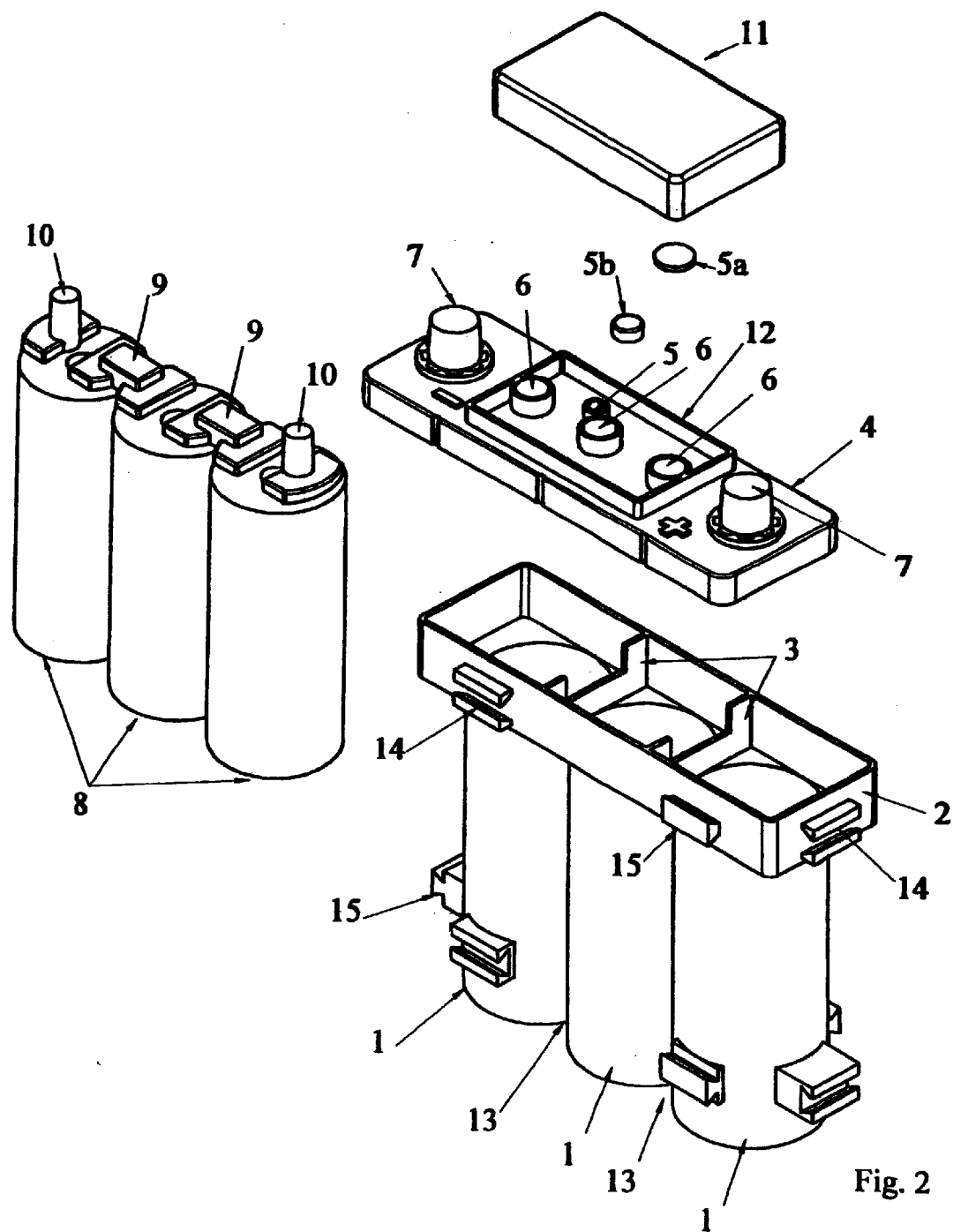
FIG. 2 is an exploded view of the battery of FIG. 1.

FIGS. 1 and 2 show an electrical storage battery according to the invention, comprising three cells which in turn are comprised of that many cylinders (1) that are parallel to and independent of each other and placed in a single plane. As seen in FIG. 2, cylinders (1) end at their open tops in a vessel (2) passing through the base of the vessel. The ends of the cylinders are separated by intermediate partitions (3) in the vessel. Vessel (2) is closed with a lid (4) that is provided with a gas stack (5) in which a cylindrical valve (5b) is provided which is made of a special elastomer which ensures gas outlet but prevents its entry, thereby ensuring correct operation of the gas recombination system. The lid (4) is further provided with three orifices (6), each opposite the open base of a respective cylinder (1) for filling with acid during formation or first charging of the battery. Also embedded in the lid (4) are cold-stamped bushings (7) which are welded to the terminals of the end elements of the battery, thus forming its positive and negative terminals.

FIG. 2 also shows elements (8) which are housed in cylinders (1), and which are spiral wound electrodes coated in a glass microfiber separator. The elements (8) are connected to each other by bridges (9) with COS welding or automatic mold fusion. Terminals (10) project from end elements (8) to be welded to bushings (7) of lid (4).

FIG. 2 also shows a cover (11) coupled onto ribbing or partition (12) which encloses orifices (5) and (6) in order to seal them.

Cylinders (1) may be tangent or next to each other. In either case, there are longitudinal spaces (13) left between adjacent vessels which permit sufficient and even ventilation of all cells.

According to a further feature of the invention, the outside of the battery, at least on one side of the vessel, is provided with complementary means of mechanical attachment to other vessels, comprising female elements (14) and male elements (15) provided on at least two opposing faces of the vessel.

In FIG. 1, the vessel (2) is provided on each of its longer sides with a female element (14) and a male element (15), while on one of its shorter sides, it has a female element (14) and on the opposite shorter side a male element (15).

In FIG. 2, vessel (2) is also provided on one of its longer sides with a female element (14) and with a male element (15), and also on its opposite longer side, not shown. The vessel may also have two elements 14 at one longer side and two elements 15 at the other longer side.

Figure 3:
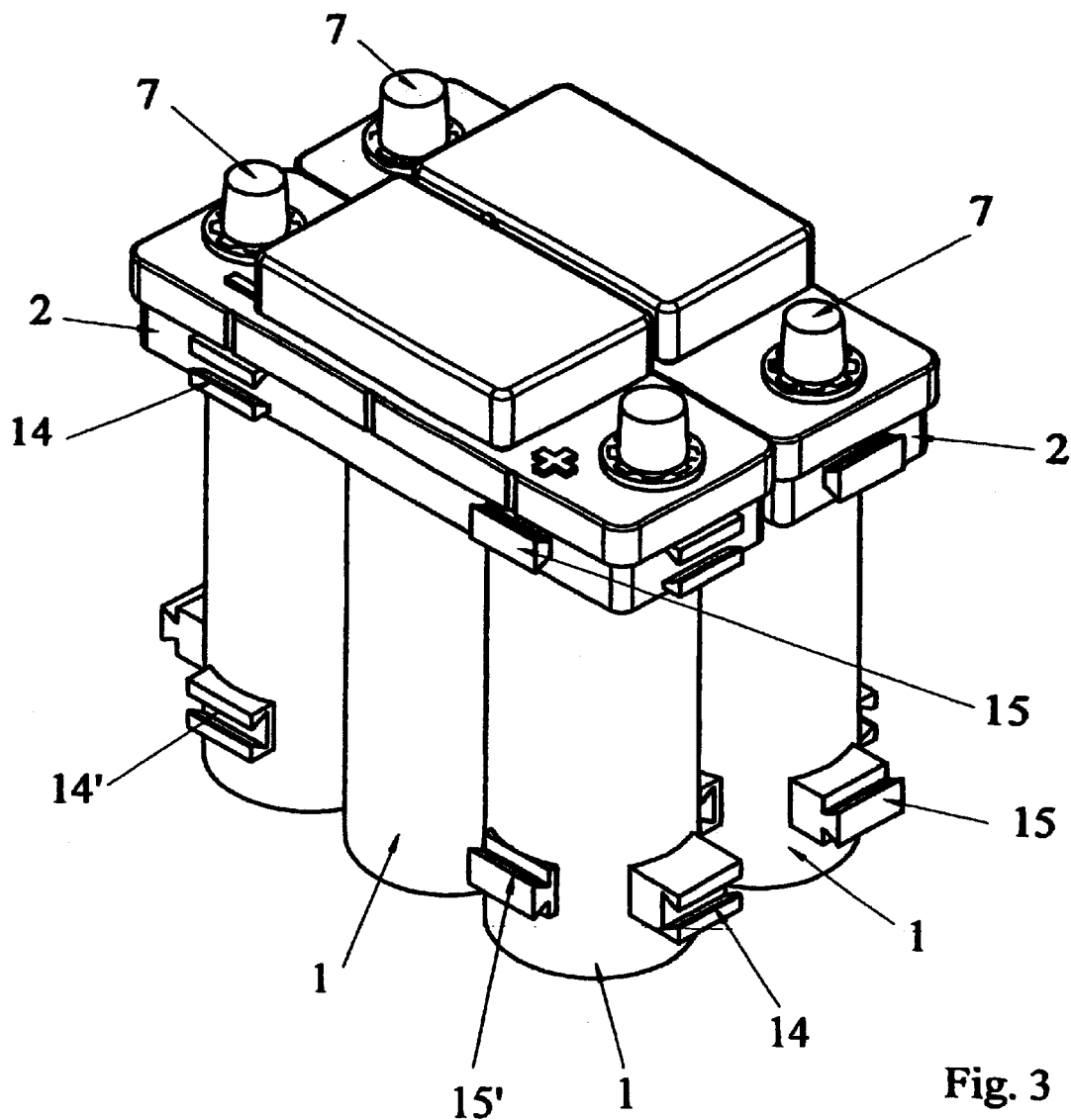
FIG. 3 shows one possible way of connecting two batteries such as the one shown in FIG. 1 through their greater sides.

Additionally, as shown in FIG. 3, cylinders (1) may be also provided at diametrically opposite positions with female elements (14') and male elements (15'). Both may have a dovetail shape, so that two or more batteries may be joined in various positions by relative sliding motions.

Female elements (14') and male elements (15') of cylinders (1) project out from the side surface of the cylinders, so that they are in the same plane as female elements (14) and male elements (15) of vessel (2).

Assuming each element or battery cell shown in FIGS. 1 and 2 has a rated voltage of 2 volts, when the three elements are joined in series the battery voltage would be 6 volts.

Figure 4:
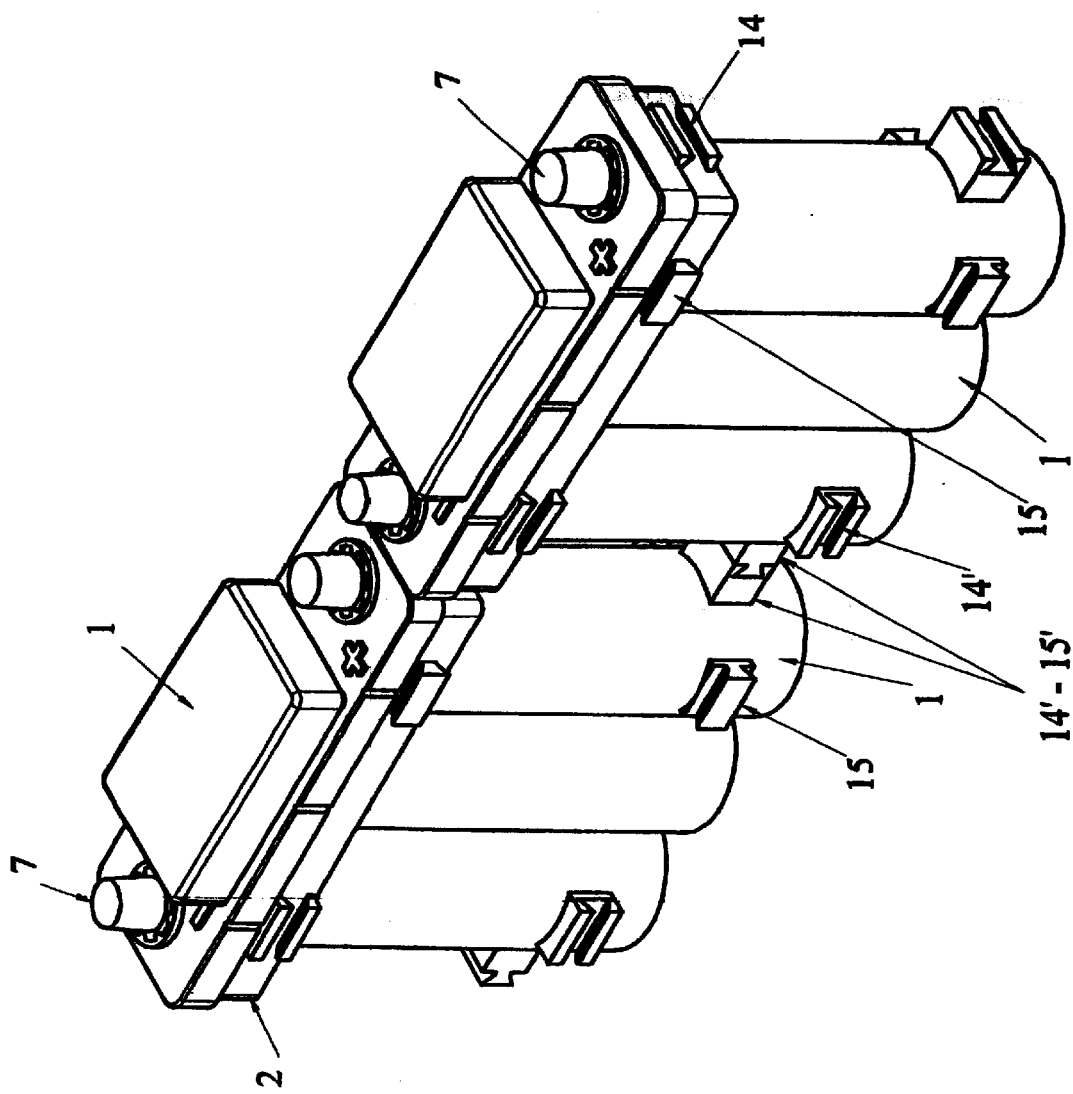
FIG. 4 shows another possible way of connecting these batteries through their minor sides.

FIGS. 3 and 4 show two possible ways of connecting two batteries such as that of FIG. 1. In FIG. 3, the batteries are connected by joining female and male elements (14) and (15) of the longer walls of vessel (2) and opposite female elements and male elements (14') and (15') of adjacent cylinders (19) of the two batteries.

In both couplings of FIGS. 3 and 4, ventilation spaces are left between cells or cylinders (1) which ensure uniform ventilation of all cells.

In the coupling shown in FIGS. 3 and 4, bushings (7) of opposite polarity will define the connection terminals while the others will be connected by a connector as described further below.

Figure 5:
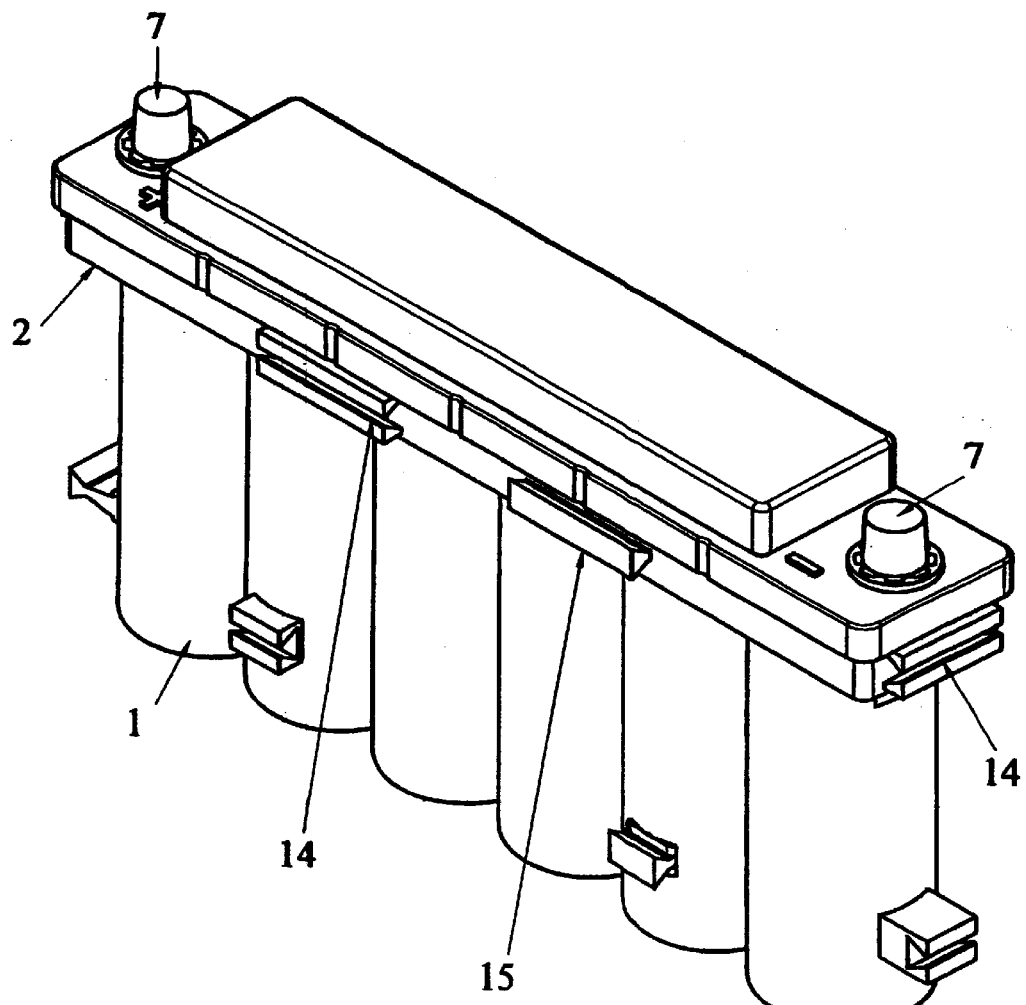
FIG. 5 is a perspective view of a battery according to a second embodiment, with six cells in which the vessel is provided with complementary mechanical means of attachment.

FIG. 5 shows a battery with six cells or elements, providing 12 volts if each cell provides 2 volts as mentioned above. In this case, only the vessel (2) is provided with female elements (14) and male elements (15) on its faces, with the cylinders lacking such connection means.

In any case vessel (2) is provided with transverse partitions (3) such as those shown in FIG. 2, provided with a central groove for passage of the connection bridges (9) between adjacent elements (8).

Figure 6:
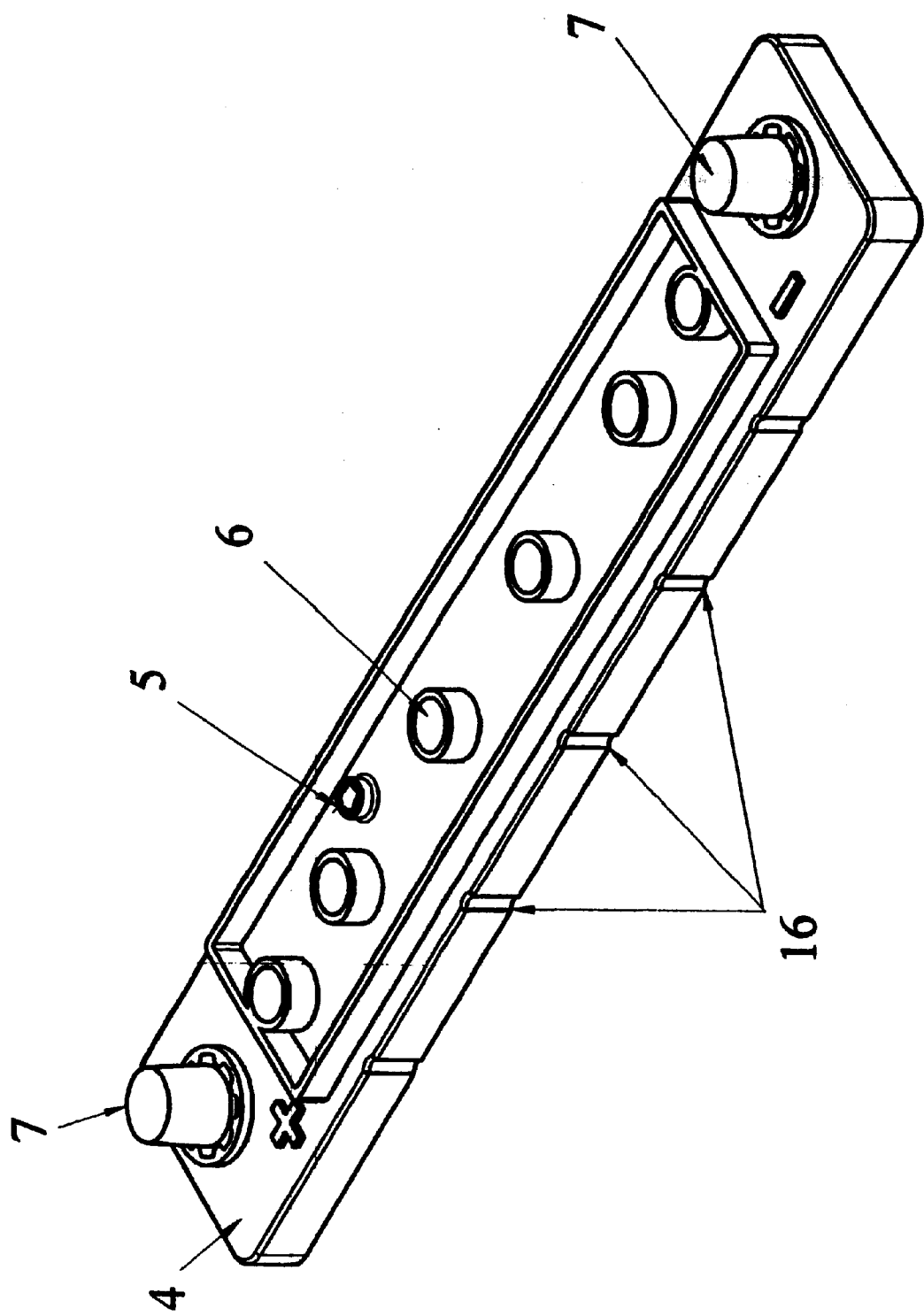
FIG. 6 is a top perspective view of a lid for the battery of FIG. 5.

FIG. 6 shows a top perspective view of a lid (4) for a battery, such as that of FIG. 5. This lid is similar to that in FIG. 2, and the same number labeling is used for its components. As can be seen, its longer surfaces have vertical ducts (16) through which air may circulate to aid refrigeration of the cells, when two or more batteries are attached along their longer sides.

Figure 7:
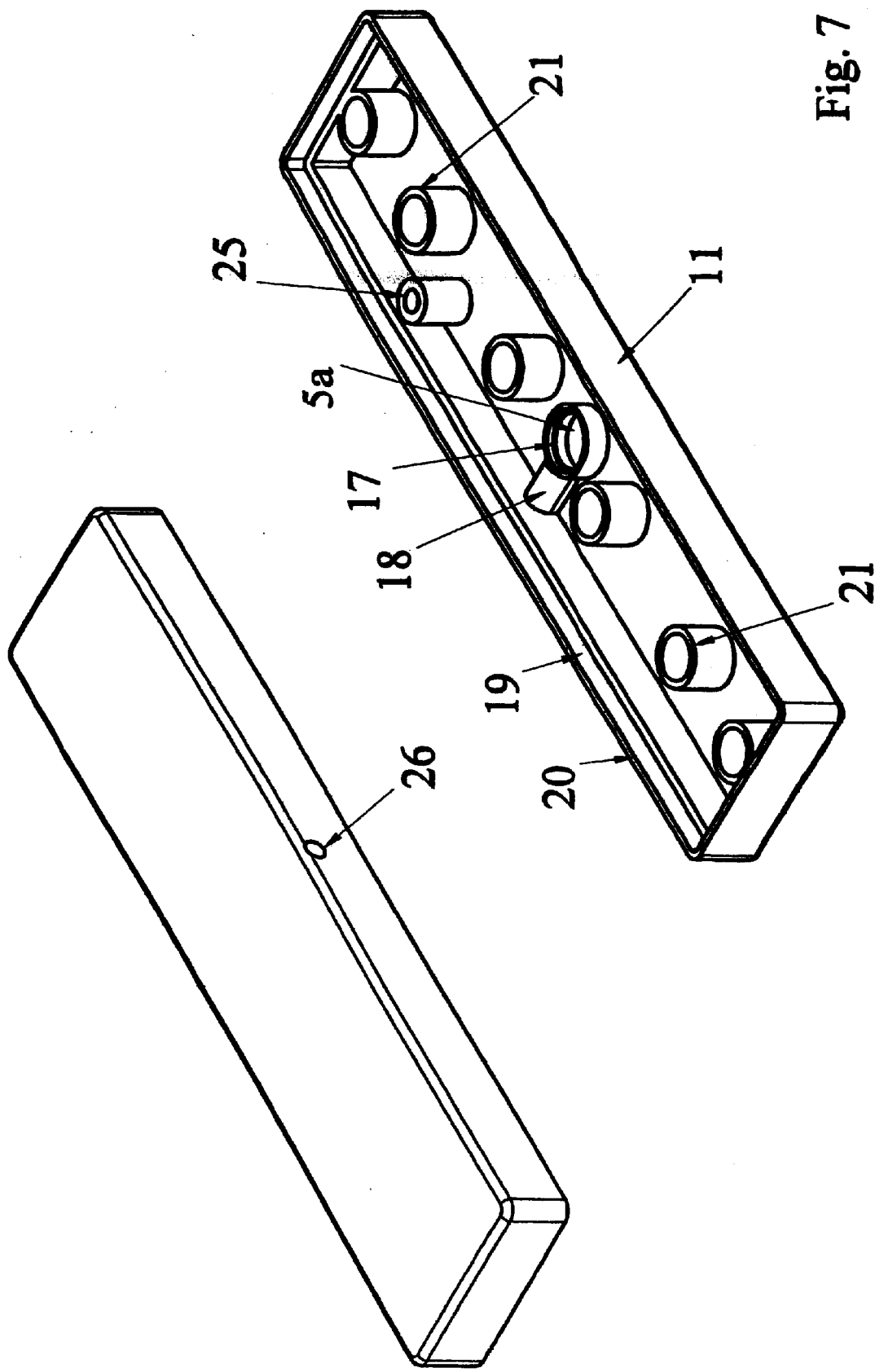
FIG. 7 is a bottom perspective view of a cover for a six cell battery such as that shown in FIG. 5.

FIG. 7 shows a bottom perspective view of a cover (11) which can be coupled onto the lid of FIG. 6. The cover is provided with a circular central flange (17) in which is placed the vyon pill (5a), beneath which runs a radial duct (18) which ends at duct (19), whose outer wall (20) is provided with an orifice (26) for gas outlet. The cover is also provided with a number of annular flanges (21) on its bottom surface, which match orifices (6) of lid (4), and with a cylindrical flange (25) which holds in place valve (5b) on the gas stack (5) so that the gases leave through the sides of the valve and no air may enter.

Figure 8:
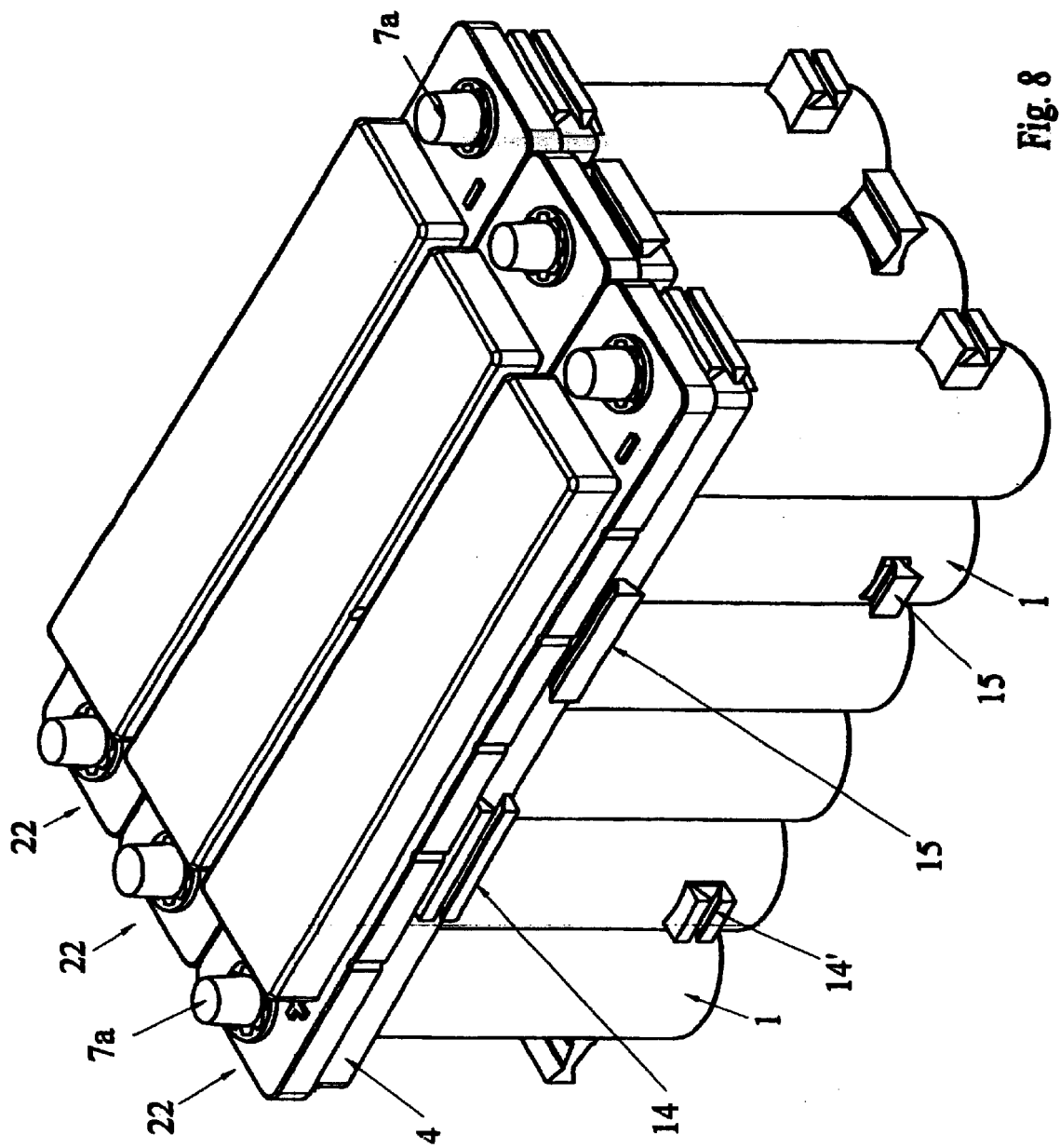
FIGS. 8 and 9 show two forms of attaching three batteries such as that of FIG. 7.

FIG. 8 shows a compact arrangement of three batteries (22), each consisting of six cylindrical cells (1), which have been joined at their longer sides and are connected to each other by female elements (14) and male elements (15) along the longer sides of vessels (4). In this compact arrangement, bushings (7a) may be used as outlet connection terminals, and these are connected to the other bushings by connectors, as described with reference to FIG. 10.

Figure 9:
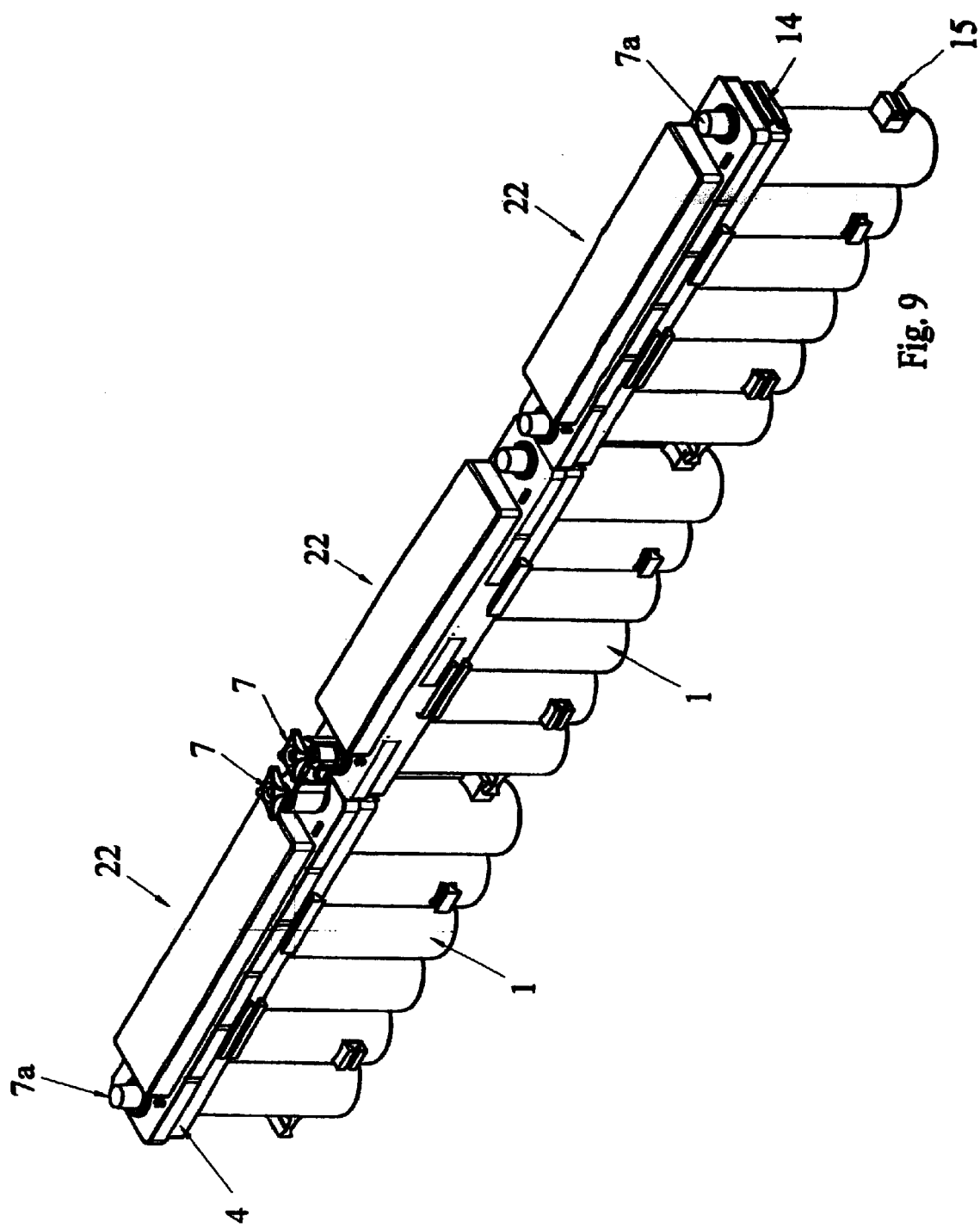

FIG. 9 shows a different arrangement of the three batteries of FIG. 8.

In FIG. 9, the three batteries (22) are shown in a coplanar arrangement, joined to each other by female elements (14) and male elements (15) along the shorter sides of vessels (4). In FIG. 9, end bushings (7a) form the current terminals while intermediate bushings (7) are connected to each other by bridges, as described below with reference to FIG. 10. Using gas recombination type batteries with an immobilized electrolyte embedded in the separator which allows the battery to operate in any position, the arrangement of FIG. 9 allows a horizontal position of the set, thus enabling use in spaces which were previously considered impossible to use for batteries in automobiles.

In both of FIGS. 8 and 9, when the voltage of each cell is 2 volts, an arrangement is obtained with a rated voltage of 36 volts.

Figure 10:
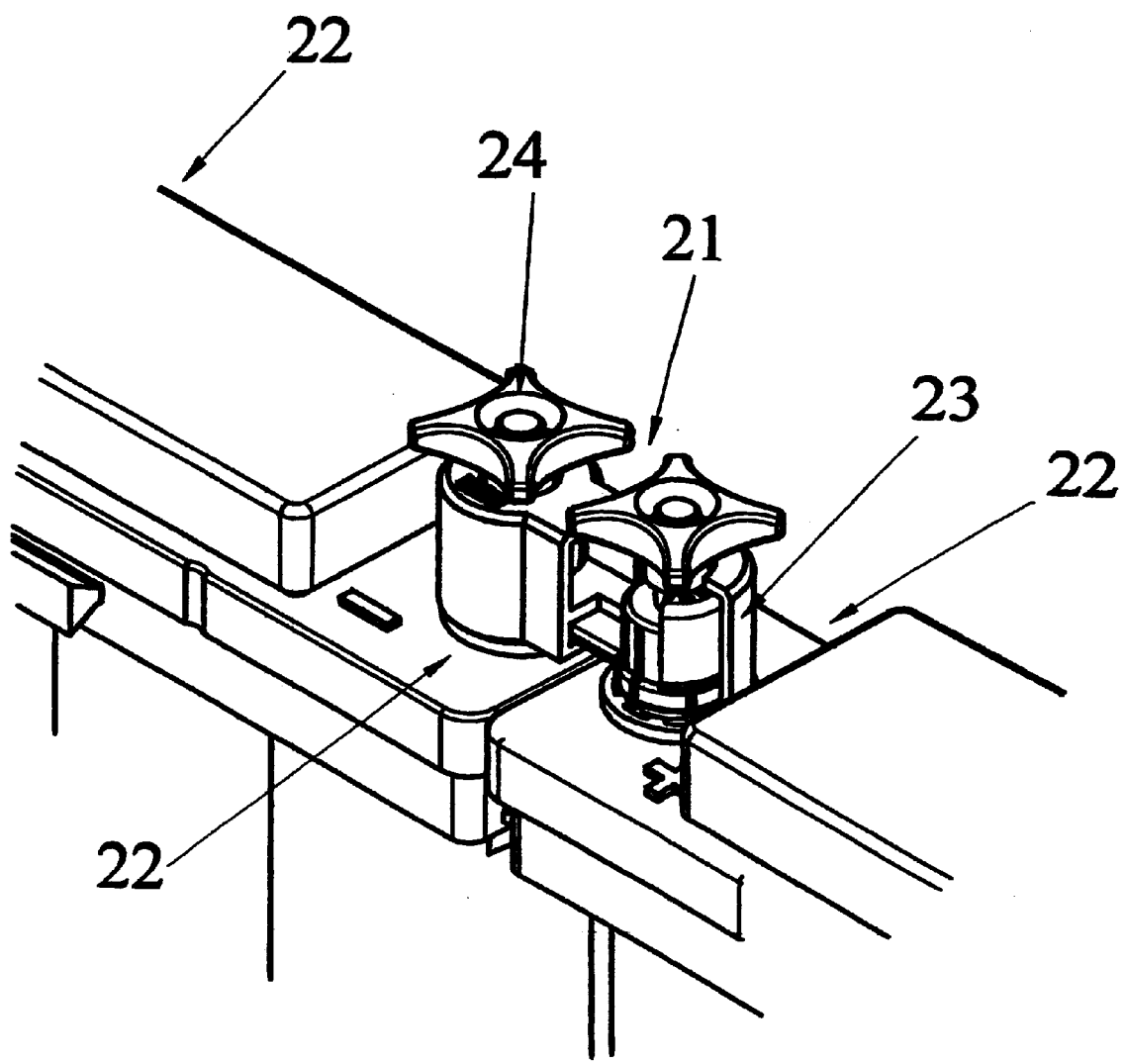
FIG. 10 shows a possible connector, in a partially sectioned view, for electrical connection of the various batteries.

Lastly, FIG. 10 shows a possible embodiment of a connection (21) for electrical connection between coupled batteries. Connection (21) essentially comprises a metal bridge (22) ending in two clamps (23) which can be adapted to the size of the corresponding bushing (7). The clamps (23) are tightened with butterfly nuts (24) which when turning press on bushing (7), providing a connection which is reliable and highly resistant to vibrations.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electric storage cell battery comprising:
    a plurality of cells for being electrically interconnected, each cell comprising a respective independent cylinder having a top that is open, the cylinders being oriented parallel and near each other, with at least a plurality of the cylinders oriented in a plane;
    a common vessel located at the open tops of each of the cylinders and holding the cylinders in their respective orientation with reference to each other, the vessel having an external lateral surface;
    complementary attachment elements on the lateral surface of the vessel for enabling mechanical attachment of the vessel to other vessels with complementary attachment elements.

2. The electric storage cell battery of claim 1, wherein the mechanical attachment elements comprises respective complementary female connecting elements and male connecting elements, wherein the male connecting elements on one of the vessels engage the female connecting elements on another of the vessels.

3. The electric storage battery of claim 1, wherein the vessel lateral surface comprises opposite lateral surfaces and the complementary attachment elements are attached to the opposite lateral surfaces of the vessel.

4. The battery of claim 1, wherein the cylinders have respective lateral surfaces and further comprising second complementary attachment elements on the lateral surfaces of the cylinders, located at the same height on the cylinders and on diametrically opposing positions thereon.

5. The battery of claim 1, wherein the vessel lateral surface comprises opposite longer walls joined by opposite shorter walls;
    the mechanical attachment elements comprise a female connecting element on one of the longer walls and a male connecting element on the opposite longer wall.

6. The battery of claim 5, wherein there are two female connecting elements on one of the longer walls and two male elements on the opposite longer wall.

7. The battery of claim 5, wherein there is at least one female connecting element and one male connecting element on one of the longer walls, and in complementary position there is one male connecting element and one female connecting element on the opposite long wall of the vessel.

8. The battery of claim 4, wherein the male and the female connecting elements have a complementary dovetail shape oriented for allowing attachment by the dovetail shape connecting elements being slid in a direction together and separated.

9. The battery of claim 1, wherein the male and the female connecting elements have a complementary dovetail shape oriented for allowing attachment by the dovetail shape connecting elements being slid in a direction together and separated.

10. The battery of claim 1, preferably comprising inner transverse partitions provided in and extending across the vessel at locations corresponding to the separation between adjacent cylinders;
    a central top groove in each of the partitions for passage of electrical connection, bridges between adjacent cells.

11. The electric storage battery of claim 1, wherein the battery comprises electrically interconnected cells, each of which comprise positive plates, negative plates, intermediate separators and electrolyte.

12. In combination, a plurality of the batteries of claim 1, wherein each of the batteries is arranged adjacent another of the batteries, with the respective vessels of the adjacent batteries adjacent to each other and the complementary attachment elements on one of the vessels being attached in a complementary manner to the complementary attachment elements of the other of the vessels creating a combination comprised of at least two pluralities of cylinders in at least two planes.

13. In combination, at least two electrical storage batteries from claim 1, wherein the vessel of each battery has opposite longer surfaces and joined by opposite shorter surfaces;

complementary attachment elements are disposed on the respective shorter sides of the vessel and two of the batteries being assembled in the same plane by the mechanical attachment elements on the opposed two shorter vessel sides of the two batteries being mechanically connected, wherein the two batteries have the cylinders arrayed in the same plane.

* * * * *